United States Patent
Ho et al.

(10) Patent No.: US 7,793,118 B2
(45) Date of Patent: Sep. 7, 2010

(54) ELECTRONIC DEVICE WITH A PLURALITY OF CHARGING MODES

(75) Inventors: David Ho, Shanghai (CN); Tao Hsia, Shanghai (CN)

(73) Assignee: Inventec Appliances Corp., Taipei Hsien (TW)

( * ) Notice: Subject to any disclaimer, the term of this patent is extended or adjusted under 35 U.S.C. 154(b) by 840 days.

(21) Appl. No.: 11/618,064

(22) Filed: Dec. 29, 2006

(65) Prior Publication Data

US 2007/0168684 A1    Jul. 19, 2007

(30) Foreign Application Priority Data

Dec. 30, 2005  (TW) .............................. 94147456 A (51) Int. Cl.
G06F 1/00 (2006.01)
G06F 13/20 (2006.01)
H02J 7/00 (2006.01)
G05F 5/00 (2006.01)

(52) U.S. Cl. ................. 713/300; 713/340; 320/137; 323/299; 710/313

(58) Field of Classification Search ............... 713/300, 713/340; 320/137; 323/299; 710/313
See application file for complete search history.

(56) References Cited

U.S. PATENT DOCUMENTS

| | | | | |
|---|---|---|---|---|
| 6,665,801 B1 * | 12/2003 | Weiss | ....................... | 713/300 |
| 6,936,936 B2 * | 8/2005 | Fischer et al. | ............... | 307/151 |
| 2004/0246341 A1 * | 12/2004 | Lee et al. | ............... | 348/207.99 |
| 2005/0174710 A1 * | 8/2005 | Masui et al. | ................. | 361/92 |

* cited by examiner

*Primary Examiner*—Stefan Stoynov
(74) *Attorney, Agent, or Firm*—Thomas, Kayden, Horstemeyer & Risley (57) ABSTRACT

An electronic device with several charging modes includes a transmission module, a central control module, an interface module, and a power module. The transmission module includes a first connecting terminal for connecting an external electronic product and produces a corresponding identification signal according to each external electronic product. The central control module supplies different power supplies to each external electronic product and produces a corresponding power setting signal. The interface module obtains a different power supply for each external electronic product through the transmitting module and converts each different power supply into a same charging power according to the power setting signal and identification signal. The power is stored in the power module to charge the power module, so that the electronic device just needs a transmitting module to obtain the power from any external electronic product, and thus greatly improve the convenience of charging the electronic device.

18 Claims, 5 Drawing Sheets

ELECTRONIC DEVICE WITH A PLURALITY OF CHARGING MODES

RELATED APPLICATIONS

The present application is based on, and claims priority from, Taiwan Application Serial Number 94147456, filed Dec. 30, 2005, the disclosure of which is hereby incorporated by reference herein in its entirety.

BACKGROUND

1. Field of Invention

The present invention relates to an electronic device. More particularly, the present invention relates to an electronic device with several charging modes.

2. Description of Related Art

With advances in technology, more and more electronic products are becoming available to the public. The development of electronic products, such as pen drives, MP3 players, digital cameras, etc., brings comforts and convenience to people. The above-mentioned electronic device is a device that is convenient to carry, mobile, and highly compatible with many different computers. People can transfer or backup data between the electronic device and a computer quickly and safely, no matter if the data is an image, a document, or audio and video signals. People can move the electronic device between different computers so that data can be accessed to and from different computers. Presently, the storage sizes of the electronic devices are increasing due to research and development in component fabrication.

The electronic devices in the prior art can generally be divided into two categories. The first category includes devices each of which has an external power supply. This kind of device is called a BUS-powered device, wherein the pen drive is an example of a BUS-powered device. The second category includes devices each of which has an internal power supply. This kind of device is called a self-powered device, wherein the multi-media player is an example of a self-powered device. The BUS-powered devices obtain power externally through the Universal Serial Bus (USB). The self-powered devices are further divided into three sub-categories as below.

In the first sub-category, a self-powered device includes a DC power module. The DC power module includes a DC power terminal to electrically connect to a transformer, wherein the transformer is capable of transforming an AC power, for example, 110V/60 Hz, into a corresponding DC power for the external electronic device.

In the second sub-category, the electronic device is internally equipped with a battery module, wherein the battery can include a primary battery or a rechargeable battery, to provide stable DC power to the external electronic device. For the battery module including a rechargeable battery, if the electronic device is electrically connected to a personal computer (PC) through a USB, the electronic device can obtain operating power from the computer through the USB. Meanwhile, the electronic device can store the power obtained in a rechargeable battery to recharge the rechargeable battery.

In the third sub-category, both the battery module and the DC power module are installed within the electronic device, such that the electronic device is capable of obtain operating power and charging power from a computer that the device is connected to, and is capable of obtaining DC power to operate and charge the transformer.

However, for the self-powered electronic device in the prior art, it is necessary to install a USB terminal and a DC power terminal on the housing at the same time to support the battery module and the DC power module simultaneously. Hence the cost of the components, design and fabrication of the electronic device is increased, and the housing is over-sized. For the forgoing reasons, there is a need for electronic devices with a plurality of charging modes.

SUMMARY

The present invention is directed to an electronic device that satisfies the need to install different charging terminals on the housing at the same time to support different charging modules simultaneously.

It is therefore an aspect of the present invention to provide an electronic device with a plurality of charging modes. The electronic device of the present invention can be electrically connected to external electronic devices, such as a computer system or a transformer. The power provided by the external electronic devices is transformed into a charging power by the electronic device of the present invention. The charging power is further stored in a power module of the electronic device so as to conveniently charge the electronic device.

In accordance with the foregoing and other aspects of the present invention, an electronic device with a plurality of charging modes is provided that includes a transmission module, a central control module, an interface module and a power module. The transmission module can obtain power for normal operation of the electronic device from a computer system, e.g., a PC with a Universal Serial Bus (USB), or a transformer, and further generates a corresponding identification signal according to the external electronic device. The central control module is electrically connected to the transmission module, and is capable of generating a corresponding power setting signal according to the power the external electronic device can provide, and further transmits the power to the interface module. The interface module is electrically connected to the transmission module and the central control module, and receives the power and the identification signals transmitted by the external electronic device through the transmission module so as to transform the power provided by the external electronic devices into a charging power for the normal operation and charging of the electronic device according to the power setting signals and/or the identification signals, respectively and correspondingly. The charging power is further stored in the power module to charge the power module, such that the power module can provide more power for the normal operation of the central control module.

According to an embodiment of the present invention, in the electronic device with a plurality of charging modes, the interface module preferably includes a path selection unit, a transforming unit and a management unit. The path selection unit is electrically connected to the transmission module and the central control module so as to receive an identification signal and a power setting signal from the transmission module and the central control module. A corresponding switching signal is further generated and transmitted to the transforming unit according to the identification signal and the power setting signal. The management unit is electrically connected to the transmission module in order to obtain power provided by the external electronic device through the transmission module. This power is transformed to transformed power correspondingly. The transformed power is further transmitted to the transforming unit. The transforming unit transforms the transformed power in to the charging power according to the switching signal, and further transmits the charging power to the power module to charge the power module.

In conclusion, the invention transforms power from different sources into the same charging power for better efficiency.

Moreover, the invention implements the electronic device with a plurality of charging modes that solves the drawbacks and problems in the prior art.

These and other features, aspects, and advantages of the present invention will become better understood with reference to the following description, figures, and appended claims.

It is to be understood that both the foregoing general description and the following detailed description are by examples, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

Figure 1:
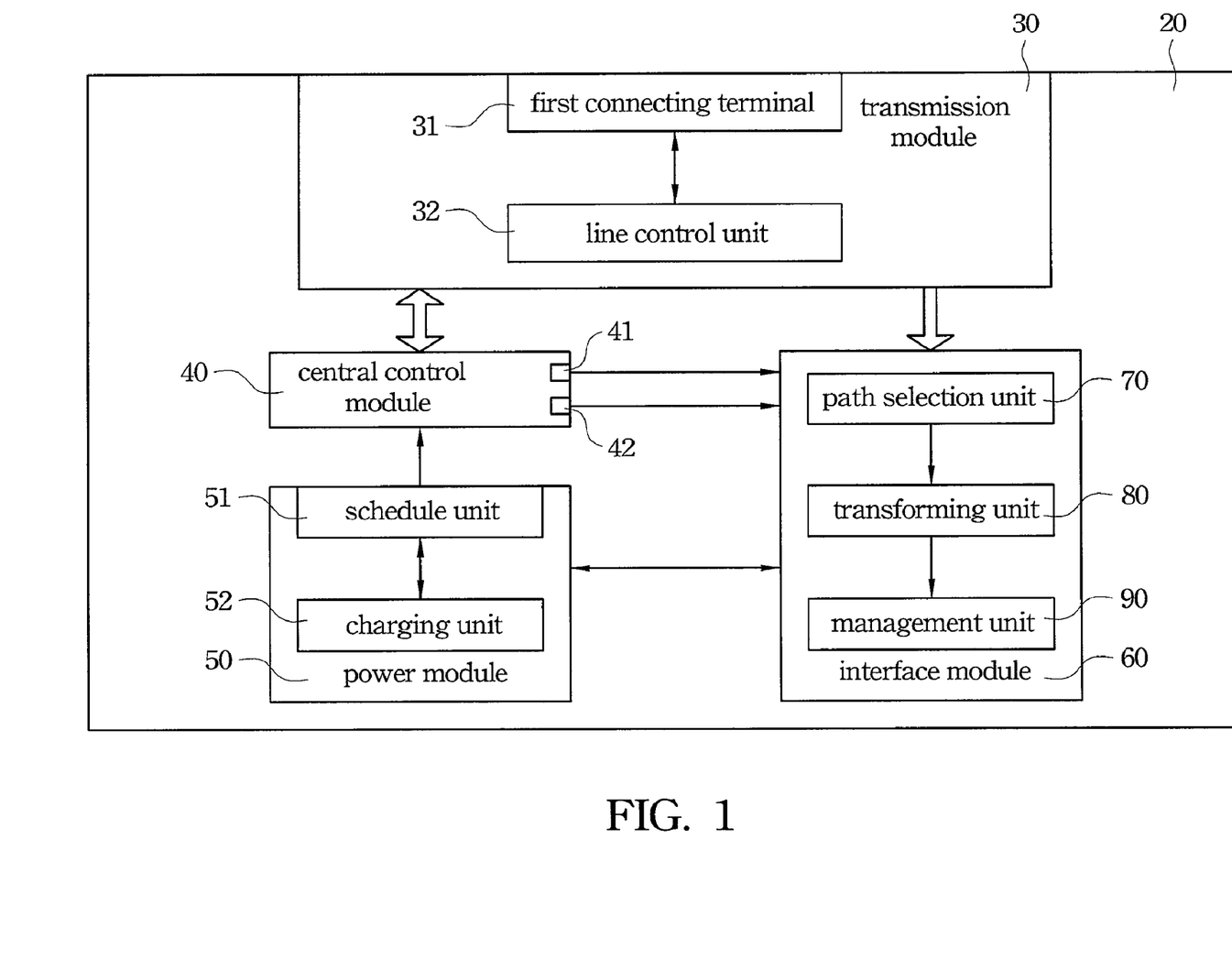
FIG. 1 is a diagram illustrating the circuit structure according to an electronic device of the present invention.
Figure 2:
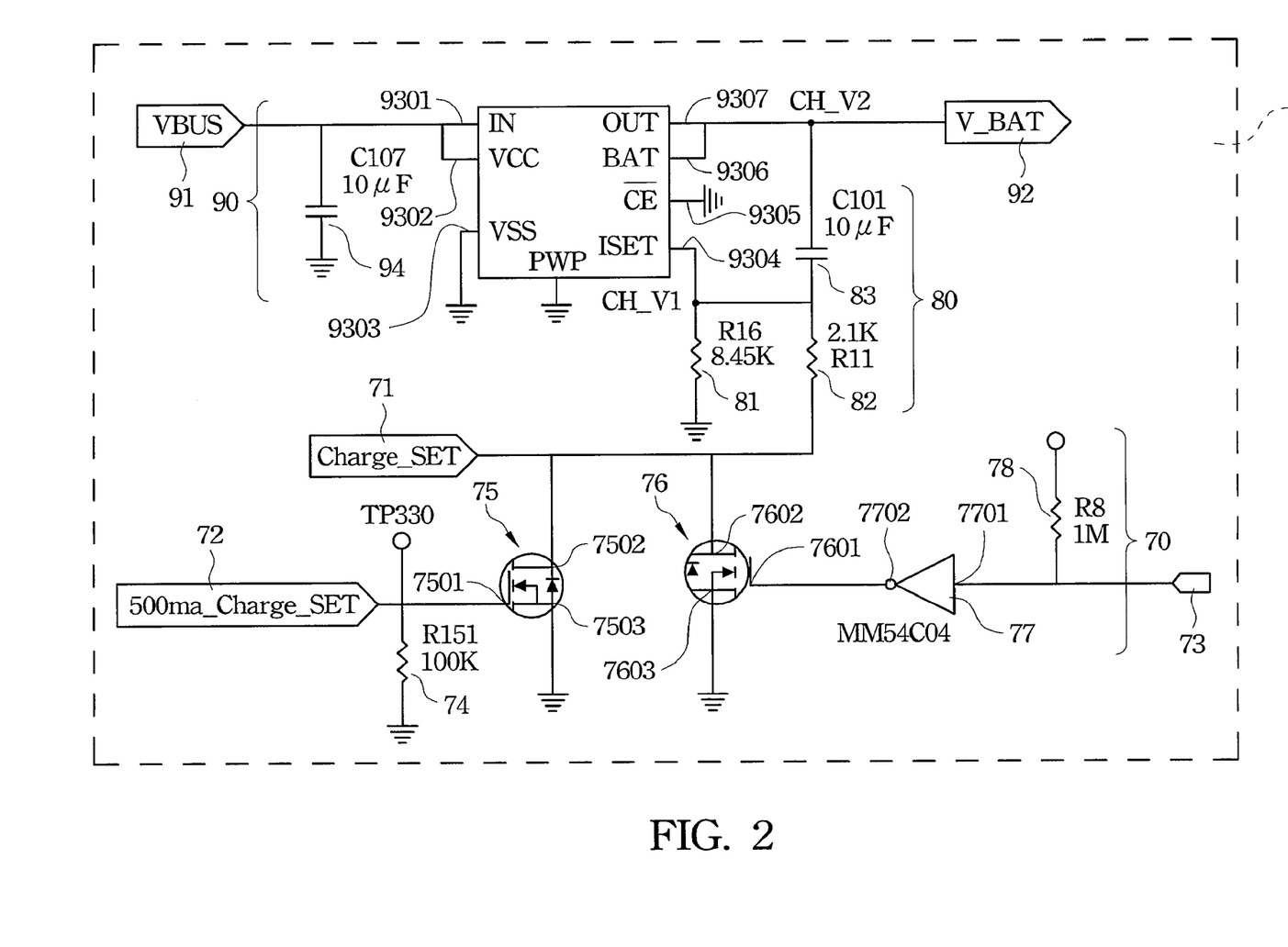
FIG. 2 is a circuit diagram of an interface module of the electronic of the present invention.

An electronic device with a plurality of charging modes is provided by the present invention. Referring to FIG. 1, an electronic device 20, such as a MP3 player, a mobile phone or a Personal Digital Assistant (PDA), includes a transmission module 30, such as a USB, a central control module 40, an interface module 60 and a power module 50. The transmission module 30 is electrically connected to an external electronic device, such as a computer system 22, wherein a notebook shown in FIG. 4 and a personal computer are two of the examples, or a transformer 23 as shown in FIG. 5. The transmission module 30 can further identify the external electronic device and provide an identification signal correspondingly. Consequently, the electronic device 20 can transmit/receive data to/from the external electronic device, and obtain from the external electronic device power for normal operation of the electronic device 20. The central control module 40 is electrically connected to the transmission module 30 in order to obtain the data output from the external electronic device or to transmit the data to the external electronic device through the transmission module 30. The central control module 40 generates a power setting signal according to the power that the external electronic device can provide, or the power corresponding to negotiations between the electronic device 20 and the external electronic device, and transmits the power setting signal to the interface module 60. The interface module 60 is electrically connected to the transmission module 30 to obtain the power provided by the external electronic device through the transmission module 30. The interface module 60 is further capable of detecting the power and transforming the various power provided by different external electronic devices into a same charging power CH_V2 (as shown in FIG. 2) for a normal operation and a normal charging task of the electronic device 20, according to the power setting signal and/or the identification signal. The charging power CH_V2 is further stored in the power module 50, such that the power module 50 can be charged to provide power to the central control module 40 for a normal operation.

Referring to FIG. 1 again, the electronic device 20 only needs to utilize a signal transmission module 30 to obtain power for normal operation from the external electronic device. Therefore, compared to the prior art, now, there is no need for the present invention to utilize a great number of transmission modules, which may include a DC power terminal and a USB terminal, to electrically connect to a plurality of external electronic devices. In accordance, the cost and the time for the fabrication and design of the components can be reduced. At the same time, the size and the weight of the electronic device 20 are decreased. Moreover, in the present invention, the electronic device 20 can electrically connect to various external electronic devices and obtain power from the external electronic devices individually. The electronic device 20 can further transform the power from the different external electronic devices into the same charging power CH_V2, and therefore increasing the convenience and the compatibility in charging the electronic device 20.

Figure 4:
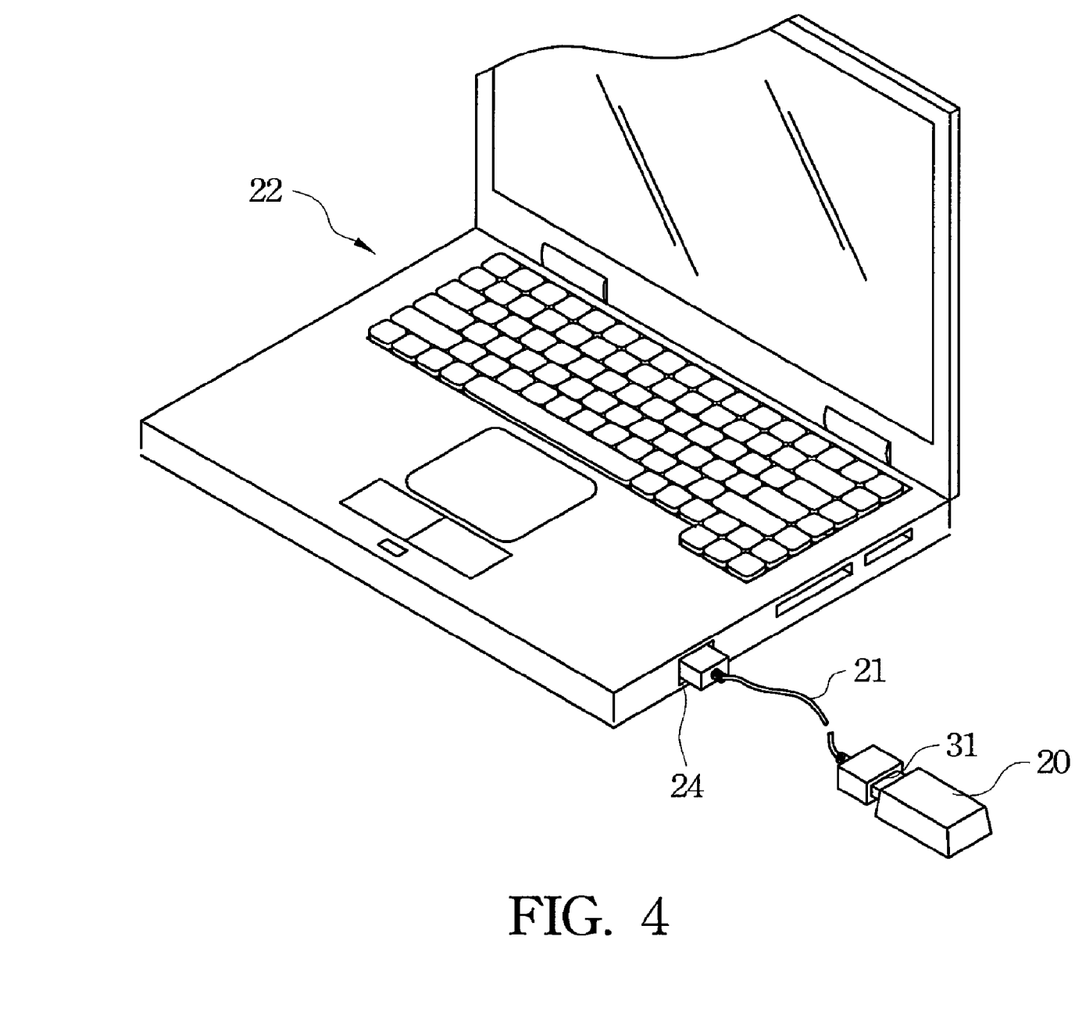
FIG. 4 is a solid diagram illustrating an electronic device of the present invention electrically connected to a computer system.
Figure 5:
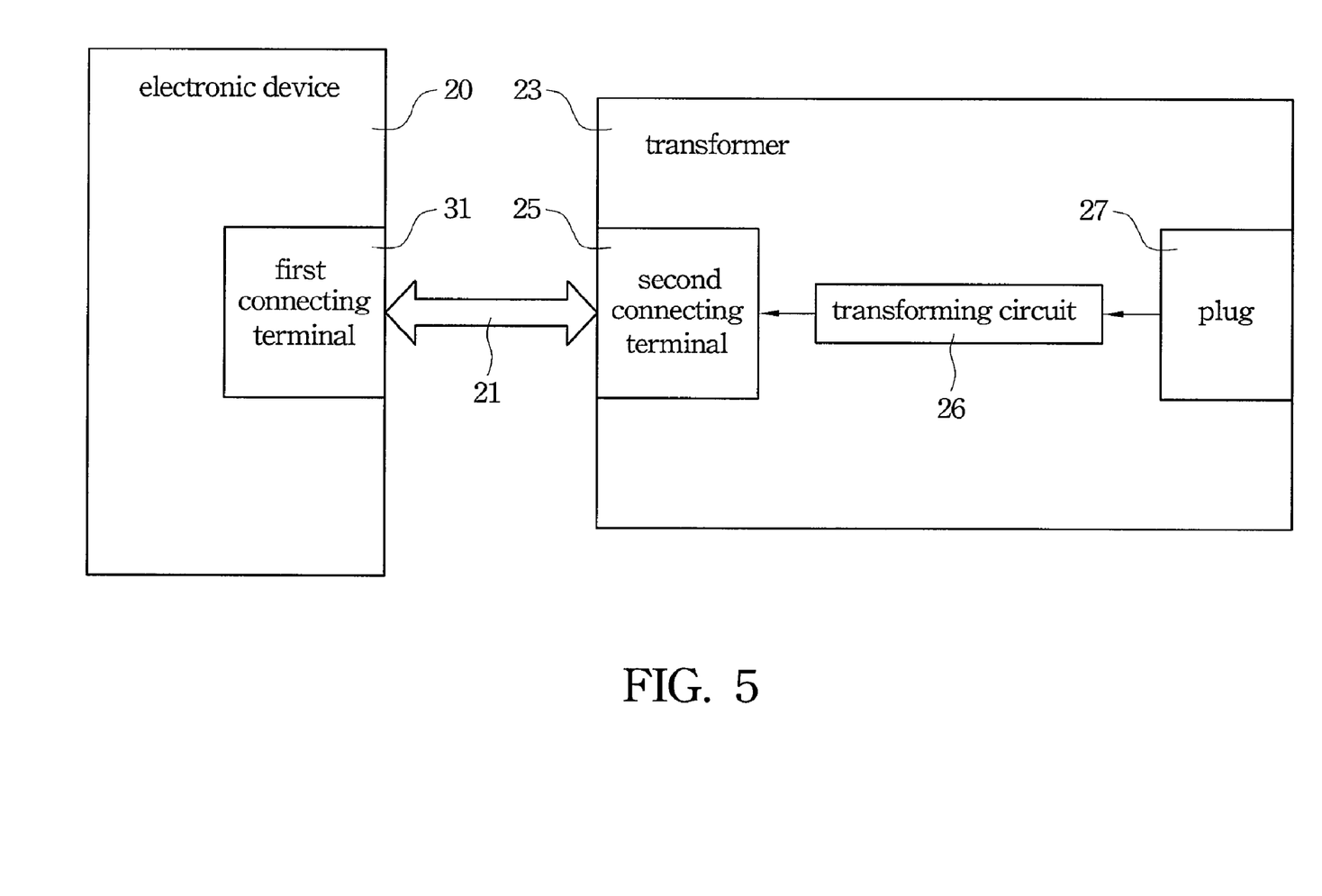
FIG. 5 is a circuit diagram illustrating an electronic device of the present invention electrically connected to a transformer.

Please note that, referring to FIGS. 1 and 2, the power provided by the external electronic devices can include a first power provided by the computer system 22 as shown in FIG. 4 (5V/100 mA), a second power (5V/500 mA), and/or a third power (5V/500 mA, for example) provided by the transformer 23 as shown in FIG. 5. Hence, the central control module 40 may output a first power setting signal from a first power setting pin 41 and/or output a second power setting signal from a second power setting pin 42, according to the first power, the second power and/or the third power provided by the external electronic devices. When the electronic device 20 is electrically connected to the computer system 22 and obtains the first power (5V/100 mA), the interface module 60 enters a first charging mode. The first power is transformed into the charging power CH_V2, and the charging power CH_V2 is then stored in the power module 50 to charge the electronic device 20.

Referring to FIGS. 1 and 2, when the electronic device 20 is electrically connected to the computer system 22 (as shown in FIG. 4) and obtains the second power (5V/500 mA), the interface module 60 enters a second charging mode. The second power is transformed into the charging power CH_V2, and the charging power CH_V2 is then stored in the power module 50 to charge the electronic device 20. Similarly, when the electronic device 20 is electrically connected to the transformer 23 (as shown in FIG. 5) and obtains the third power, the interface module 60 enters a third charging mode. The third power is transformed into the charging power CH_V2, and the charging power CH_V2 is then stored in the power module 50 to charge the electronic device 20.

Referring to FIGS. 1 and 2 again, the transmission module 30 includes a first connecting terminal 31 and a line control unit 32, wherein the first connecting terminal 31 can connect to the second connecting terminals 24 and 25 of each of the external electronic devices through a transmission line 21 (as shown in FIGS. 4 and 5), such that the electronic device 20 and the external electronic device are electrically connected, the line control unit 32 is electrically connected to the first connecting terminal 31, and the line control unit 32 is electrically connected to the external electronic device through the first connecting terminal 31.

Figure 3:
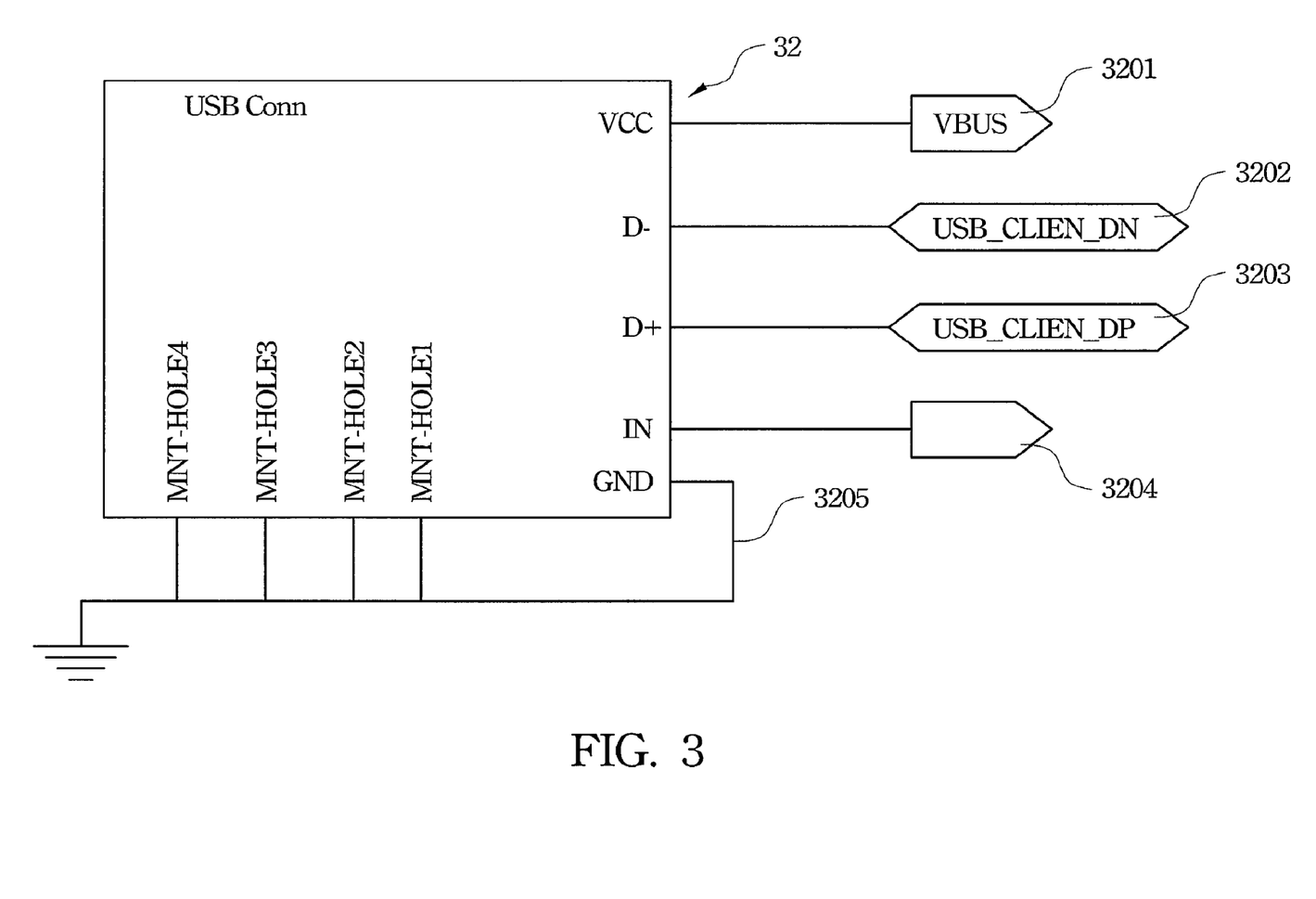
FIG. 3 is a diagram illustrating the structure of a line control unit of a transmission module according to an electronic device of the present invention.

Referring to FIGS. 1 and 3, the line control unit 32 further includes a power supply 3201, a grounding unit 3205 and two signal transmission ends 3202 and 3203. The power supply unit 3201 is connected to the power circuit of the external electronic device to receive power from the external electronic device. The grounding unit 3205 is coupled to the grounded loop of the external electronic device. And the two signal transmission ends 3202 and 3203 are coupled to data lines of the external electronic devices in order to obtain data from the external electronic devices, and to further transmit the data to the central control module 40, such that the electronic device 20 can negotiate with the external electronic device to set up the power that the external electronic device can provide.

Referring again to FIG. 3, the line control unit 32 further includes an identification output 3204. When the electronic device 20 (as shown in FIG. 1) is electrically connected to the external electronic device and the line control unit 32 generates a corresponding identification signal, the line control unit 32 transmits the identification signal to the interface module 60 (as shown in FIGS. 1 and 2) through the identification output 3204, such that the interface module 60 can determine the external electronic device according to the identification signal. For example, when the line control unit 32 determines that the external electronic device is the computer system 22 (as shown in FIG. 4), the line control unit 32 generates a first identification signal. Alternately, when the line control unit 32 determines that the external electronic device is the transformer 23 (as shown in FIG. 5), the line control unit 32 generates a second identification signal (at a low level). Consequently, the interface module 60 can determine whether the external electronic device is the computer system 22 or the transformer 23 or other external electronic device according to the first identification signal or the second identification signal.

Referring to FIGS. 1 and 2, the interface module 60 includes a path selection unit 70, a transforming unit 80 and a management unit 90. The path selection unit 70 is electrically connected to the transmission module 30, and the first power setting pin 41 and the second power setting pin 42 of the central control module 40, to obtain the identification signal, the first power setting signal and the second power setting signal from the transmission module 30 and the central control module 40, respectively. The path selection unit 70 can generate a switching signal corresponding to the identification signal, the first power setting signal and the second power setting signal. The path selection unit 70 further transmits the switching signal to the transforming unit 80. The management unit 90 is electrically connected to the transmission module 30 to receive the power (the first power, the second power or the third power) provided by the external electronic device through the transmission module 30, and transforming the obtained power to the corresponding transformed power CH_V1 and then transmitting the transformed power CH_V1 to the transforming unit 80. Afterwards, the transforming unit 80 transforms the transformed power CH_V1 into the charging power CH_V2 according to the switching signal, and then transmits the charging power CH_V2 to the power module 50 to charge the power module 50.

Moreover, referring to FIGS. 1 and 2, the path selection unit 70 includes a first setting pin 71, a second setting pin 72 and an identification pin 73. The first setting pin 71 is electrically connected to the first power setting pin 41 of the central control module 40 to obtain the first power setting signal from the central control module 40; while the second setting pin 72 is electrically connected to the second power setting pin 42 of the central control module 40 to receive the second power setting signal from the central control module 40. The identification pin 73 is electrically connected to the identification output 3204 of the line control unit 32 (as shown in FIG. 3) to obtain the identification signal of the external electronic device.

Referring to FIGS. 1 and 2, the management unit 90 includes a power input pin 91 and a power output pin 92. The power input pin 91 is electrically connected the line control unit 32 of the transmission module 30 to receive power (the first power, the second power or the third power) provided by the external electronic device through the power supplying unit 3201 of the line control unit 32 (as shown in FIG. 3). The power output pin 92 is electrically connected to the transforming unit 80 to transmit the transformed power CH_V1 generated by the management unit 90 to the transforming unit 80.

Further, referring to FIG. 1, the power module 50 includes a schedule unit 51 and a charging unit 52. The schedule unit 51 is electrically connected to the charging unit 52 and the central control module 40. The schedule unit 51 obtains power stored within the charging unit 52 and transmits the power to the central control module 40 to provide power for normal operation of the central control module 40. The schedule unit 51 is further electrically connected to the interface module 60 to receive the charging power CH_V2 from the interface module 60 (as shown in FIG. 2), and storing the charging power CH_V2 to the charging unit 52 to charge the charging unit 52.

Referring to FIG. 5, the transformer 23 can be formed by the second connecting terminal 25, a transforming circuit 26 and a plug 27 being coupled together in order. The plug 27 can be plugged into a socket installed on the wall (not shown in the drawings), such that the transformer 23 can obtain general AC power (110V/60 Hz for example) from the socket. The transforming circuit 26 is capable of transforming the AC power into a power with a lower voltage, for example, to a AC power of 5V/500 mA, and then transmitting the transformed AC power out through the second connecting terminal 25.

Please note that, referring to FIG. 4, when the electronic device 20 is electrically connected to the computer system 22, the electronic device 20 can negotiate with the computer system 22 to set up the power that the computer system 22 should provide, for example, 5V/100 mA or 5V/500 mA, such that the electronic device 20 can function and get charged correctly.

According to the present invention, in the interface module 60 of one embodiment, referring to FIGS. 1 and 2, the path selection unit 70 is composed of a first impedance component 74, such as a resistance, a first switch component 75, such as an N-channel metal oxide semiconductor (NMOS), a second switch component 76, a transforming component 77, such as an inverter, and a second impedance component 78. One end of the first impedance component 74 is electrically connected to a gate 7501 of the first switch component 75 to form the second setting pin 72, electrically connecting to the second power setting pin 42 of the central control module 40; while the other end of the first impedance component 74 is electrically grounded. The drain 7502 of the first switch component 75 is electrically connected to the transforming unit 80 and a drain 7602 of the second switch component 76 to form the first setting pin 71, electrically connecting to the first power setting pin 41 of the central control module 40. A source 7603 of the second switch component 76 is electrically grounded, and a gate 7601 of the second switch component 76 is electrically connected to an output 7702 of the transforming component 77. An input 7701 of the transforming component 77 is electrically connected to an end of the second impedance component 78 and an identification output 3204 of the line control unit 32 of the transmission module 30 (as shown in FIG. 3). The other end of the second impedance component 78 is electrically connected to the power module 50 to receive power from the power module 50.

Referring to FIG. 2, the management unit 90 includes a charging input 9301, a power end 9302, a grounded end 9303, a current setting end 9304, a trigger end 9305, a power checking end 9306 and a charging output 9307. The charging output 9301 is electrically connected to the power end 9302 and is further electrically connected to a first charged component 94 to form the input pin 91. The other end of the first charged component 94 and the grounded end 9303 are electrically grounded. The current setting end 9304 is electrically connected to the transforming unit 80 to transmit the transformed power CH_V1 to the transforming unit 80. The trigger end 9305 is electrically grounded, and the charging output 9307 is electrically connected to the power checking end 9306.

Referring to FIG. 2, the transforming unit 80 is composed of a third impedance component 81, a fourth impedance component 82 and a second charged component 83, such as a capacitance. One end of the third impedance component 81 is electrically connected to the current setting end 9304, an end of the fourth impedance component 82 and an end of the second charged component 83 of the management unit 90, and the other end of the third impedance component 81 is electrically grounded. The other end of the fourth impedance component 82 is electrically connected to the path selection unit 70, and the other end of the second charged component 83 is electrically connected to the charging output 9307 and the power checking end 9306 of the management unit 90 to form the power output pin 92, in order to transmit the charging power CH_V2 to the power module 50 (as shown in FIG. 1).

In the present embodiment, referring to FIGS. 1 and 2, when the electronic device 20 performs the charging task, the interface module 60 of the electronic device 20 provides at least four application methods that are described in the below.

First, when the electronic device 20 is electrically connected to any external electronic device, referring to FIGS. 1 and 2, the central control module 40 is not capable of detecting any external electronic device. The central control module 40 hence stops outputting the first power setting signal and the second power setting signal, and the identification output 3204 of the line control unit 32 (as shown in FIG. 3) does not output any identification signal, either. Accordingly, the second impedance component 78 of the path selection unit 70 is able to obtain power from the power module 50 to generate a signal at the high level, and then to transmit the signal to the transforming component 77. Afterwards, the transforming component 77 transforms the signal at the high level to a signal at the low level, that is, a logic 0 signal, correspondingly, and then transmits the signal at the low level to the second switch component 76, wherein the second switch component 76 is set to a cut-off state.

Second, when the electronic device 20 is electrically connected to the computer system 22 only (as shown in FIG. 4), and the electronic device 20 negotiates with the computer system 22 to make the computer system 22 transmit the initial power (5V/100 mA), the interface module 60 enters a first charging mode. Referring to FIGS. 1 and 2, the management unit 90 receives the initial power through the transmission module 30, and generates the transformed power CH_V1 accordingly. The central control module 40 provides a first power setting signal at the high level, called a logic 1 signal, and a second power setting signal at the low level, called a logic 0 signal. The central control module 40 transmits the two power setting signals to the interface module 60 through the first power setting pin 41 and the second power setting pin 42, respectively. When the path selection unit 70 receives the second power setting signal, the second power setting signal is transmitted to the first switch component 75, such that the first switch component 75 is set to a cut-off state according to the second power setting signal that is at the low level. Simultaneously, the path selection unit 70 transmits the received first power setting signal, that is, the switching signal mentioned above, to the transforming unit 80.

Referring to FIGS. 1 and 2, when the transforming unit 80 receives the first power setting signal that is at the high level, the fourth impedance component 82 is set to a cut-off state, and the management unit 90 transmits the transformed power CH_V1 to the third impedance component 81 of the transforming unit 80 for the third impedance component 81 to generate a corresponding charging power CH_V2. The charging power CH_V2 is further transmitted to the power module 50 through the power output pin 92.

Third, when the electronic device 20 is only electrically connected to the computer system 22 (as shown in FIG. 4), and negotiates with the computer system 22 to make the computer system 22 transmit the second power (5V/500 mA), the interface module 60 enters a second charging mode. Referring to FIGS. 1 and 2, the management unit 90 receives the second power though the transmission module 30, and generates a transformed power CH_V1 correspondingly. The central control module 40 generates a second power setting signal at a high level, or called a logic 1 signal, and transmits the second power setting signal to the interface module 60 through the power setting pin 42. When the path selection unit 70 receives the second power setting signal, the first switch component 75 is set to an on state. Simultaneously, the fourth impedance component 82 of the transforming component is electrically grounded through the first switch component 75, such that the fourth impedance component 82 is set to an on state. Hence, the third impedance component 81 and the fourth impedance component 82 are coupled in parallel. When the management unit 90 transmits the transformed power CH_V1 to the third impedance component 81 and the fourth impedance component 82 of the transforming unit 80, the third impedance component 81 and the fourth impedance component 82 can jointly generate the same charging power CH_V2. The charging power CH_V2 is then transmitted to the power module 50 through the power output pin 92.

Fourth, when the electronic device 20 is electrically connected to the transformer 23 only (as shown in FIG. 5), and the transformer 23 transmits the third power (5V/500 mA), the interface module 60 enters the third charging mode. Referring to FIGS. 1 and 2, the line control unit 32 detects the transformer 23 and generates the second identification signal at a low level, and further transmits the second identification signal through the identification output 3204 (as shown in FIG. 3) to the interface module 60. After receiving the second identification signal through the input 7701, the transforming component 77 of the path selection unit 70 transforms the second identification signal into a signal at the high level, or called a logic 1 signal, accordingly. The transforming component 77 further transmits the signal at the high level to the second switch component 76 through the output 7702 so as to set the second switch component 76 to an on state. Simultaneously, the fourth impedance component 82 of the transforming component is electrically grounded through the second switch component 76 so as to set the fourth impedance component 82 to an on state, such that the third impedance component 81 and the fourth impedance component 82 are connected in parallel. Consequently, when the management unit 90 transmits the transformed power CH_V1 to the third impedance component 81 and the fourth impedance component 82 of the transforming unit 80, the third impedance component 81 and the fourth impedance component 82 can jointly generate the charging power CH_V2. The charging power CH_V2 can be further transmitted to the power module 50 through the power output pin 92.

Please note, referring to FIGS. 1 and 2, a preferred embodiment of the management unit 90, capable of controlling the charging task of the power module 50 of the electronic device 20, may be one of the li-ion charge management ICs among the bqTINY series, e.g., bq24013, made by Texas Instruments Inc. However, the li-ion charge management ICs are only exemplary and not restrictive to the management unit 90 of the present invention. The ones that generate transformed power and transmit it to the transforming unit to generate corresponding charging power are all covered by the present invention.

Although the present invention has been described in considerable detail with reference to certain preferred embodiments thereof, other embodiments are possible. Their spirit and scope of the appended claims should no be limited to the description of the preferred embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An electronic device with a plurality of charging modes, comprising:
   a transmission module, electrically connected to an external electronic device, for receiving data output from the external electronic device, or transmitting data to the external electronic device, and detecting the external electronic device to provide a corresponding identification signal;
   a central control module, electrically connected to the transmission module, capable of providing a power setting signal corresponding to the power provided by the external electronic device;
   an interface module, electrically connected to the central control module for receiving the power setting signal, and electrically connected to the transmission module for receiving the identification signal and power provided by the external electronic device, and transferring the power provided by the external electronic device to a charging power for the electronic device corresponding to the power setting signal and the identification signal, wherein the interface module further comprises:
      a path selection unit, electrically connected with the transmission module and the central control module, to receive the identification signal and the power setting signal, and generating a switching signal corresponding to the identification signal and the power setting signal;
   a management unit, electrically connected to the transmission module, to receive power provided by the external electronic device through the transmission module when the electronic device and the external electronic device are electrically connected to each other, and transforming the power to a corresponding transformed power; and
      a transforming unit, electrically connected to the path selection unit to obtain the switching signal, and electrically connected to the management unit to obtain the transformed power, and capable of transforming the transformed power into a charging power corresponding to the switching signal; and
   a power module, electrically connected to the interface module to receive and store the charging power, and electrically connected to the central control module to transmit a power to the central control module for a normal operation.

2. The electronic device of claim 1, wherein the external electronic device is a computer system, capable of providing power after negotiations with the electronic device, such that the electronic device can enter a charging mode after obtaining the power.

3. The electronic device of claim 2, wherein the computer system provides a first power or a second power after negotiations with the electronic device, such that the electronic device enters a first charging mode after obtaining the first power, or the electronic device enters a second charging mode after obtaining the second power.

4. The electronic device of claim 1, wherein the external electronic device is a transformer to provide power, wherein the electronic device enters a charging mode after receiving the power.

5. The electronic device of claim 4, wherein the transformer comprises:
   a plug for plugging into a socket in order to obtain alternating current power (AC power) from the socket;
   a transforming circuit, electrically connected to the plug in order to obtain the AC power and transforms the AC power into a power with lower voltage; and
   a first connecting terminal, electrically connected to the transforming circuit to obtain the power.

6. The electronic device of claim 5, wherein the first connecting terminal is a universal serial bus (USB) terminal.

7. The electronic device of claim 1, wherein the central control module comprises:
   a first power setting pin, electrically connected to the interface module, for outputting a first power setting signal when the electronic device is electrically connected to the external electronic device, wherein the first power setting signal is at a high level or at a low level; and
   a second power setting pin, electrically connected to the interface module, to output a second power setting signal when the electronic device is electrically connected to the external electronic device, wherein the second power setting signal is at a high level or at a low level.

8. The electronic device of claim 1, wherein the path selection unit comprises:
   a first setting pin, electrically connected to a first power setting pin of the central control module, to receive a first power setting signal;
   a second setting pin, electrically connected to a second power setting pin of the central control module, to receive a second power setting signal; and
   an identification pin, electrically connected to the transmission module, to receive the identification signal.

9. The electronic device of claim 8, wherein the path selection unit comprises:
   a first impedance component, with an end electrically connected to the power module;

a transforming component, with an input electrically connected to another end of the first impedance component and an identification output unit of a line control unit of the transmission module;

a first switch component, with a source electrically connected to the grounded loop, a gate electrically connected to an output of the transforming component;

a second switch component, with a drain electrically connected to the transforming unit and a drain of the first switch component to form the first setting pin together; and a second impedance component, with an end electrically connected to a gate of the second switch component to form the second setting pin together, and with another end electrically connected to a grounded loop.

10. The electronic device of claim 9, wherein the management unit comprises:

a power end;

a charging input end, electrically connected to the power end, and electrically connected to an end of a first charged component to form a power input pin together;

a grounded end, electrically connected to the grounded loop, while another end of the first charged component is electrically connected to the grounded loop as well;

a current setting end, electrically connected to the transforming unit;

a trigger end, electrically connected to the grounded loop;

a power checking end; and a charging output end, electrically connected to the power checking end to form a power output pin together with the transforming unit.

11. The electronic device of claim 10, wherein the transforming unit comprises:

a fourth impedance component, with an end electrically connected to the path selection unit;

a second charged component, with an end electrically connected to the charging output end of the management unit and the power checking end to form the power output pin together; and a third impedance component, with an end electrically connected to the power setting end of the management unit, another end of the fourth impedance component and another end of the second charged component, and another end electrically connected to the grounded loop.

12. The electronic device of claim 10, wherein the management unit is a charging management chip of a lithium battery.

13. The electronic device of claim 1, wherein the transmission module comprises:

a first connecting terminal, electrically connected to the external electronic device by a transmission line; and a line control unit, electrically connected to the first connecting terminal to further electrically connect the external electronic device, to detect the external electronic device and to generate the identification signal correspondingly.

14. The electronic device of claim 13, wherein the line control unit comprises:

a power supply unit, electrically connected to the first connecting terminal, to connect to a power circuit of the external electronic device when the electronic device and the external electronic device are electrically connected to each other;

a grounding unit, electrically connected to the first connecting terminal, for connecting to a grounded loop of the external electronic device when the electronic device and the external electronic device are electrically connected to each other; and two signal transmission ends, electrically connected to the first connecting terminal, to electrically connect to data of the external electronic device when the electronic device and the external electronic device are electrically connected to each other.

15. The electronic device of claim 14, wherein the line control unit further comprises:

an identification output, electrically connected to an identification pin of a path selection unit of the interface module, such that the line control unit can transmit the identification signal to the interface module.

16. The electronic device of claim 1, wherein the management unit comprises:

a power input pin, electrically connected to a line control unit of the transmission module, to obtain the power provided by the external electronic device through the power supply unit of the line control unit; and a power output pin, electrically connected to a transforming unit, to transmit transformed power to the transforming unit.

17. The electronic device of claim 1, wherein the power module comprises:

a charging unit, to store power; and a schedule unit, electrically connected to the charging unit and the interface module to obtain charging power from the interface module and store the charging power to the charging unit, and electrically connected to the central control module to provide power to the central control module for normal operation.

18. The electronic device of claim 1, wherein the electronic device comprises a MP3 player, a mobile phone or a personal digital assistant (PDA).

* * * * *